United States Patent [19]
Calvert

[11] Patent Number: 4,545,476
[45] Date of Patent: Oct. 8, 1985

[54] APPARATUS FOR ROTATING A MOVING PACKAGE HAVING SPACED GENERALLY PARALLEL OPPOSITE SIDES

[75] Inventor: Rodney K. Calvert, Dunwoody, Ga.

[73] Assignee: The Mead Corporation, Dayton, Ohio

[21] Appl. No.: 543,244

[22] Filed: Oct. 19, 1983

[51] Int. Cl.$^4$ .............................................. B65G 47/24
[52] U.S. Cl. .................................... 198/399; 198/394; 198/411
[58] Field of Search ............... 198/374, 375, 376, 411, 198/398, 394, 395, 399

[56] References Cited

U.S. PATENT DOCUMENTS

| | | | |
|---|---|---|---|
| 2,247,675 | 6/1941 | Thum | 198/374 |
| 2,895,588 | 7/1959 | Van Marle | 198/376 |
| 2,937,553 | 5/1960 | Sherman | 198/411 X |
| 3,587,876 | 6/1971 | Dahlem | 198/374 |

Primary Examiner—Joseph E. Valenza
Assistant Examiner—Jonathan D. Holmes
Attorney, Agent, or Firm—Rodgers & Rodgers

[57] ABSTRACT

A support slidably mounted for reciprocable movement above and generally parallel to a conveyor, a rotator element mounted on and movable with the support and having a generally U-shaped package enveloping device arranged to straddle the package to be rotated together with a rotatable driving device mounted on and movable with the support for imparting rotary movement to the rotator element.

2 Claims, 7 Drawing Figures

APPARATUS FOR ROTATING A MOVING PACKAGE HAVING SPACED GENERALLY PARALLEL OPPOSITE SIDES

TECHNICAL FIELD

This invention relates generally to packaging a plurality of primary packages within a secondary package such as a wrapper type enclosure and is specifically concerned with rotating one or more individual primary packages about a vertical axis so as to reorient such package or packages relative to the remaining primary packages which constitute a group of articles packaged together in a common enclosure such as a wrapper type package.

BACKGROUND ART

Widely used retail practices utilize standard article identifying indicia applied to an exposed surface of consumer items such as are marketed at retail by supermarket establishments. Such indentifying indicia in cooperation with electronic devices at each checkout station together with a centralized computer bank serve quickly and accurately to identify and price purchased items and thereby to facilitate determining the total amount due by a customer at the checkout counter.

Where primary packages and particularly primary packages which are cubical in shape are packaged in groups in a single secondary package it is possible that an exposed article indentifying indicia located on an outer surface of a primary package may be used by the checkout clerk to determine the price of the entire group of articles which of course is undesirable since the customer would by this means be able to purchase a number of primary packages for the price of a single such package.

DISCLOSURE OF THE INVENTION

According to this invention in one form, means are provided for rotating preselected ones of a series of similarly oriented packages moving along a predetermined path and such means comprises support means disposed above the predetermined path and movable in generally parallel synchronous relation with the articles moving along such path, a rotator element mounted on and movable with said support means and having a generally U-shaped package enveloping means arranged to straddle the package to be rotated with rotatable driving means mounted on and movable with the support means for imparting rotary movement to said rotator element thereby to reorient preselected ones of the primary packages and by this means to render the article identifying indicia imprinted on an external surface of certain primary packages inaccessible for cooperation with electronic means mounted at the checkout counter. Thus the secondary package having proper article identifying indicia is operative in determining the correct price of all of the primary packages included within such secondary unit.

BEST MODE OF CARRYING OUT THE INVENTION

Figure 1A:
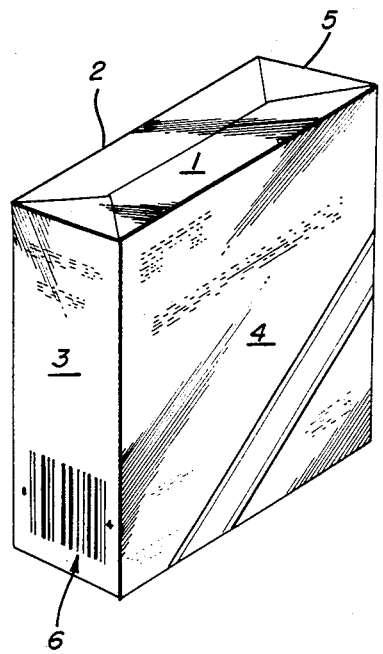
FIG. 1A is a perspective view of a primary package which is cubicle in shape and which bears article identifying indicia thereon.

FIG. 1A discloses a primary package which is of cubicle configuration and which includes top wall 1 and side walls 2, 3, 4, and 5. Article identifying indicia is appended to side wall 3 and is indicated by the numeral 6. As is obvious from FIG. 1B there is no article identifying indicia on wall 5 such as is indicated by the numeral 6 in FIG. 1A.

Figure 1B:
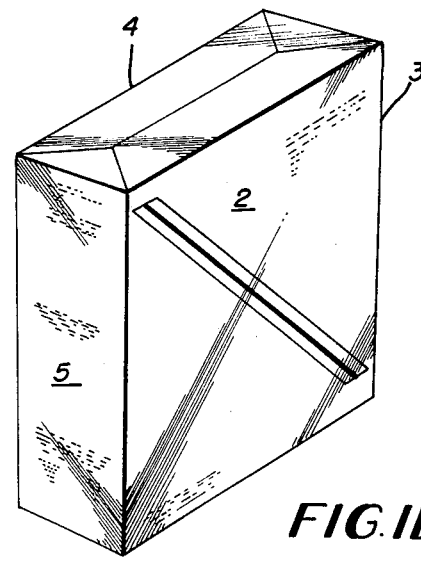
FIG. 1B is a view similar to FIG. 1A but which shows the primary package from a different vantage point from which the article identifying indicia is not observable.
Figure 1C:
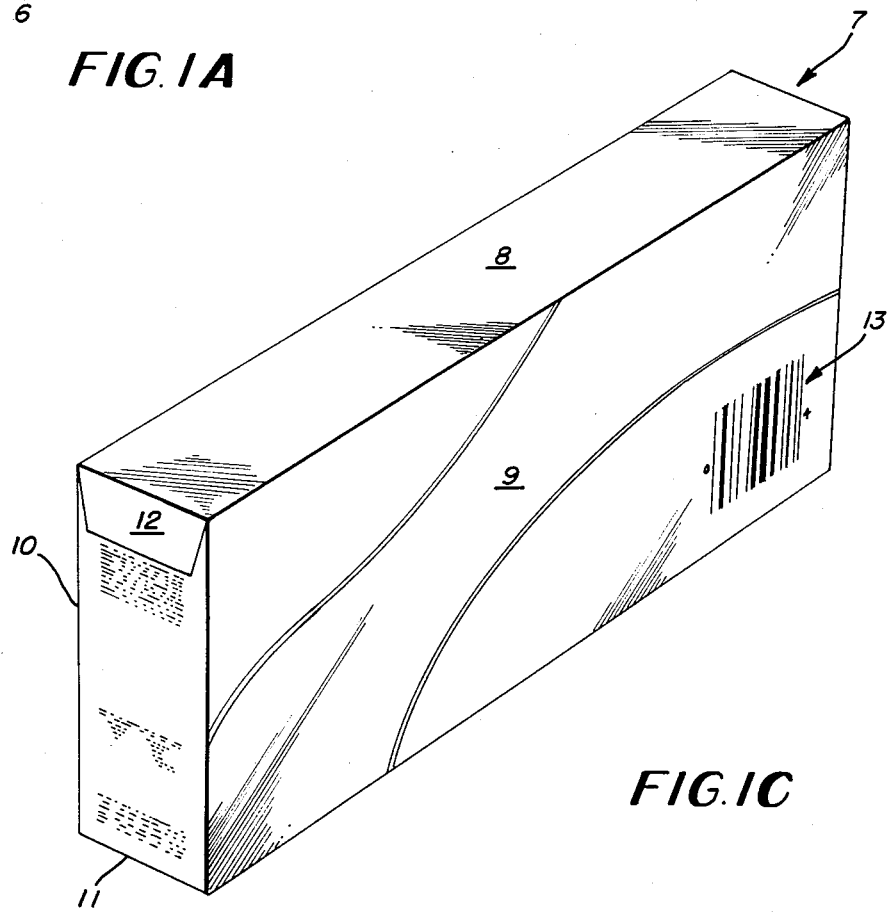
FIG. 1C simply discloses a secondary wrapper type package in which a plurality of primary packages such as are shown in FIGS. 1A and 1B are disposed.

FIG. 1C discloses a secondary package generally designated by the numeral 7 and which includes top wall 8, side walls 9 and 10 and bottom wall 11. An end panel 12 is foldably joined to each end edge of top wall 8. A plurality of primary packages such as are shown in FIGS. 1A and 1B are disposed within the wrapper 7. Article identifying indicia appears on side wall 9 of wrapper 7 and is indicated by the numeral 13.

If the package shown in FIG. 1A is disposed within the wrapper 7 so as to expose the identifying indicia 6 it is possible that a checkout clerk would use this particular indicia to determine the price of the package shown in FIG. 1C rather than the indicia indicated at 13. In view of this possibility the package such as that shown in FIG. 1A is rotated about a vertical axis so as to expose side wall 5 rather than side wall 3 and by this means to render the identifying indicia 6 inaccessible to the checkout clerk thus insuring a correct use of the identifying indicia identified at 13 in FIG. 1C.

FIGS. 2, 3, 4, and 5 show packages and essential components of the invention in solid lines while frame structure is indicated in general by phantom lines.

Figure 3:
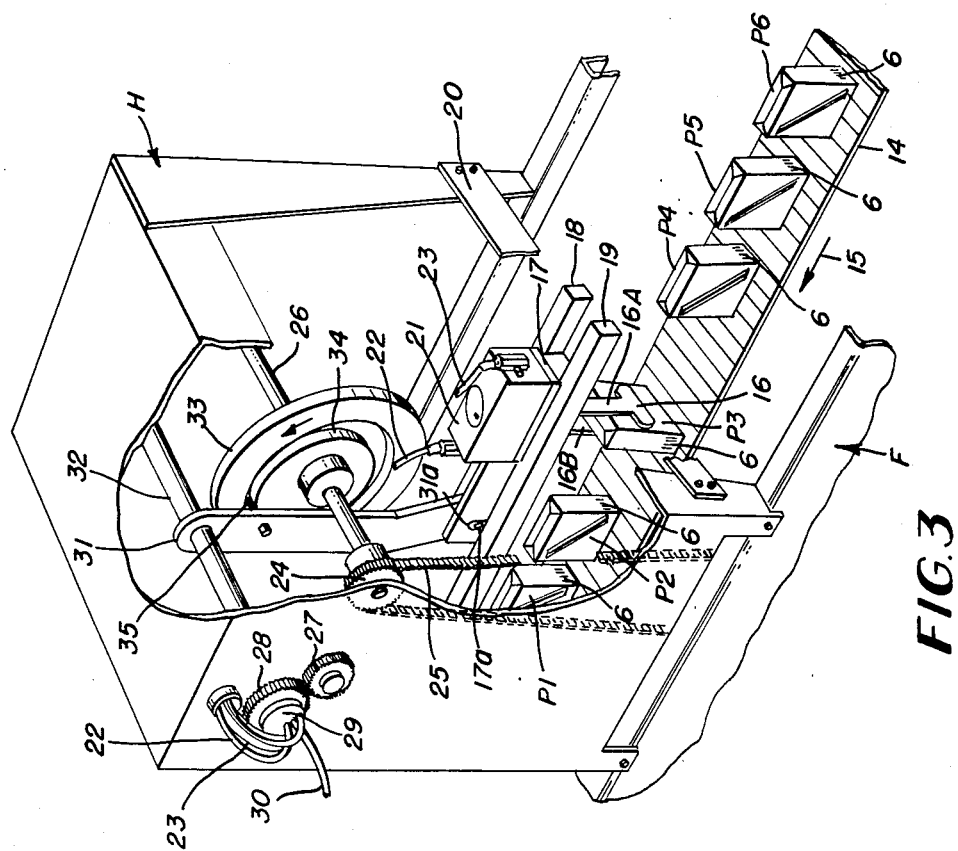
FIGS. 3 and 4 are similar to FIG. 2 and simply disclose different stages of a reorientation operation according to this invention and FIG. 5 is a view of a cam which effectively imparts reciprocatory motion to certain elements of the invention so as properly to effect reorientation of certain preselected packages.
Figure 2:
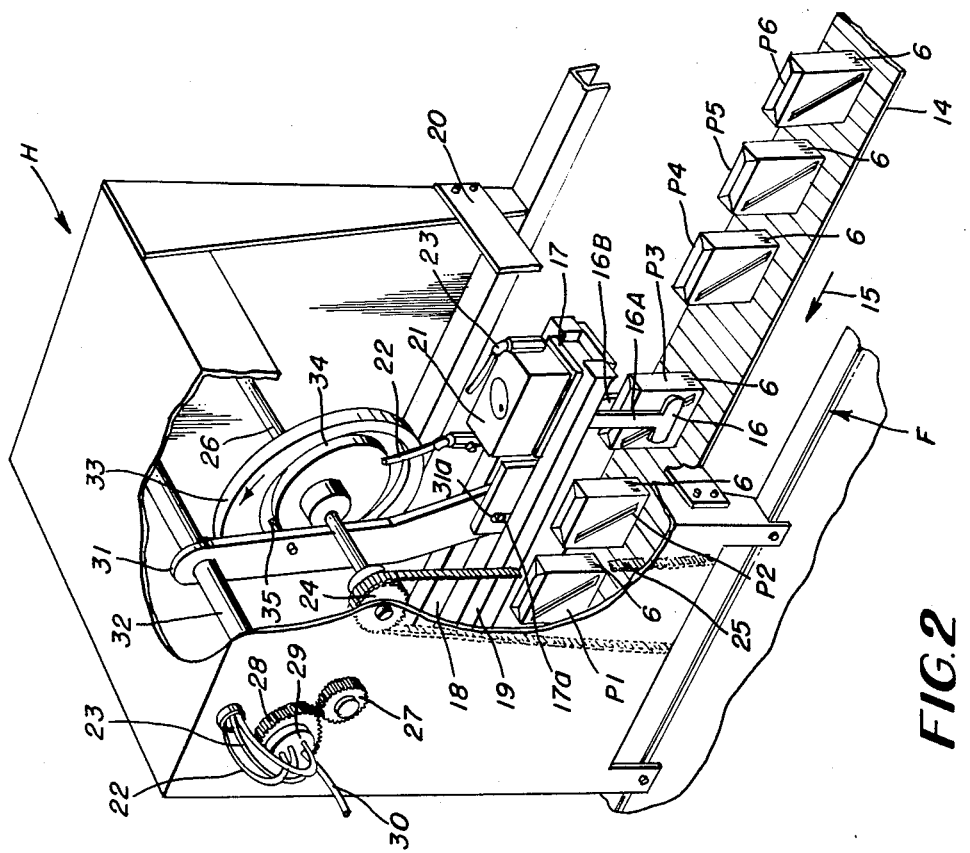
FIG. 2 is a perspective view of elements formed according to this invention and which effect rotation of preselected primary packages about a vertical axis through 180° so as to effect reorientation thereof.
Figure 5:
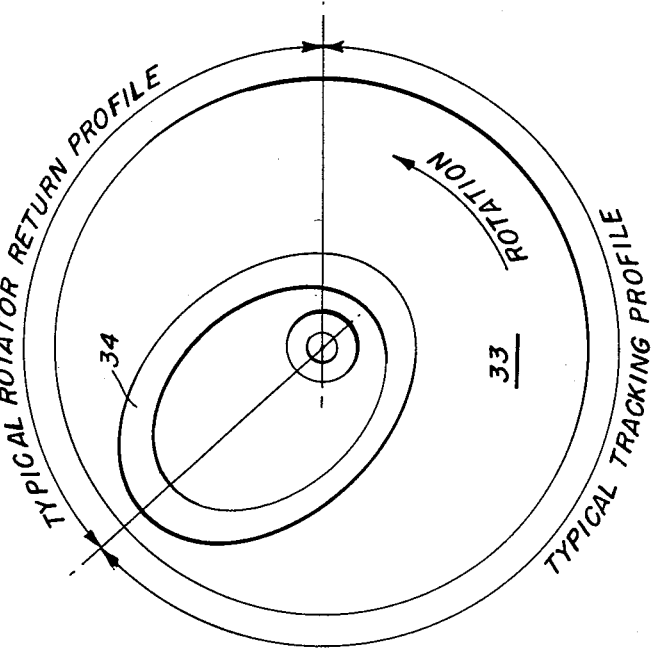
Figure 4:
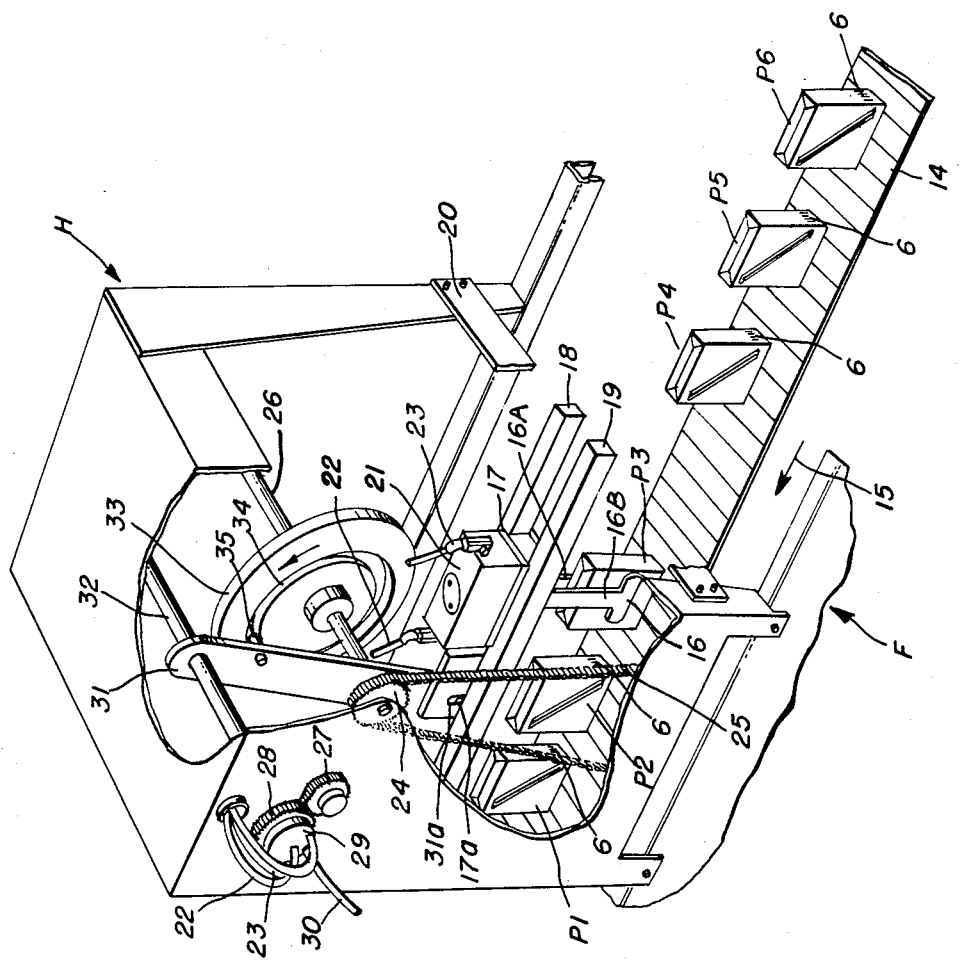

The housing generally designated at H is mounted by any suitable means atop the frame structure generally designated at F. In FIGS. 2, 3 and 4 packages are arranged in a single row in positions determined by metering means not shown. Such groups of primary packages are to be enveloped within a secondary wrapper to form a secondary package such as is represented in FIG. 1C. One group of packages is identified as including the primary packages P1, P2 and P3 while a second group of primary packages includes the packages designated P4, P5 and P6. These packages are conveyed along a predetermined path by a conveyor designated by the numeral 14. Movement of the working reach of the conveyor is generally from right to left as represented by the arrow 15. The packages P1-P6 inclusive are all oriented similarly in that the trailing wall of these packages includes the article identifying indicia 6. From the drawings it is apparent that the trailing package such as P3 and P6 if not reoriented relative to its fellows will result in the exposure of the article identifying indicia 6 as represented in FIG. 1A once the secondary package is formed as indicated in FIG. 1C. Thus according to this invention the trailing one of each package group such as P3 and P6 is rotated 180° about a vertical axis so as to render the article indicating indicia 6 inaccessible to the electronic checkout apparatus at the checkout station in a supermarket.

For the purpose of imparting rotary motion to articles such as P3 and P6 a rotator element is provided and constitutes an inverted generally U-shaped structure 16 having prongs 16a and 16b which are disposed along the sides of a package such as P3. This inverted U-shaped rotator element 16 is rotatably supported by support structure 17 which is slidably mounted on a pair of fixed guides 18 and 19 supported by the cross beam 20 of the housing H, beam 20 being broken away at its midsection so as to expose essential features of the invention. Of course the ends of guides 18 and 19 which are remote from cross bar 20 are secured by suitable bolts or other means to a similar cross bar mounted on the housing but which it not shown in the drawings.

For the purpose of imparting rotary motion to rotator element 16, a driving means 21 is provided and is secured atop support means 17. Driving means 21 is of conventional construction and is pneumatically operated. The drive shaft of driving means 21 is not shown but simply is vertical and extends downwardly and is secured to the bight portion of U-shaped rotator element 16. A suitable device may be purchased from Power Systems Inc. of Georgia and is identified as "Flo-tork" Model A-100. Generally speaking the driving means 21 incorporates a rack and pinion structure which is piston actuated by air supplied through conduit 22 and exhausted through conduit 23 in order to impart rotation in one direction such as clockwise through an angle of 180°. In order to impart reverse rotation in a counterclockwise direction to the rotator element 16, air is supplied through conduit 23 and is exhausted through conduit 22.

Control of the various components of the invention and synchronous operation of the moving parts is effected by virtue of sprocket 24 which is driven by chain 25 in synchronism with the metering mechanism and the belt 14 by the packaging machine not shown. Sprocket 24 is mounted on schematically represented shaft 26 which is journally mounted within suitable bearings supported by the housing H. Chain 25 is driven from a suitable source of energy such as an electric motor which also is connected by means not shown and in known manner so as to drive conveyor 14 in synchronism with the other elements of the machine.

For the purpose of controlling the timing of application of air to the driving means 21, a pinion 27 is securely affixed to or driven in synchronism with shaft 26 and cooperates with a gear 28 which in turn drives internal control mechanism of known construction and formed within the control device 29 so that rotation of shaft 26 results in rotation of an appropriate element within device 29 thereby alternately to supply air through conduit 22 to driving means 21 and to exhaust such air through conduit 23 and subsequently during a succeeding phase of rotation to supply air through conduit 23 to driving means 21 and to exhaust air from device 21 through conduit 22. Air for control and operation purposes is supplied to device 29 through conduit 30 from a suitable source of compressed air not shown.

FIG. 2 shows the prongs 16A and 16B of inverted U-shaped device 16 in enveloping relation relative to package P3 at the beginning of rotation of package P3. FIG. 3 shows the package P3 after rotation through 90° has been effected so that the prong 16A of the device 16 is in trailing relation to the package P3 which is located downstream somewhat from the position shown in FIG. 2.

FIG. 4 shows package P3 after it has been rotated through 180°. Thus the prong 16B is on the nearside of package P3 while the prong 16A is on the far side. The indicia 6 is now fully rotated to a position facing the corresponding face 3 of package P2. Thus when the group P1, P2 and P3 is accumulated and packaged in a secondary wrapper as shown in FIG. 1C the identifying indicia 6 is not exposed and hence will not lead to an error by a checkout clerk.

In order properly to orient the rotator device 16 relative to the device to be rotated such as primary package P3 and primary package P6, it is necessary to reciprocate the rotator 16, the support means 17 and the driving means 21. Since the support means 17 is slidably mounted on rods 18 and 19, it is simply necessary properly to control the velocity and time of movement of the parts 16, 17, and 21.

Toward this end, a driving arm 31 is pivotally mounted at its upper end on a fixed nonrotatable shaft 32 which is secured at its ends to appropriate parts of the housing H. The lower end of driving arm 31 is interconnected with support structure 17 by a lost motion connection which includes a driving pin 17a mounted on support 17 which rides in a slot 31a formed in driving arm 31. Thus to and fro motion of the driving arm 31 which causes the lower end thereof to swing in an arc about the center of oscillation 32 and reciprocatory motion of support means 17 are accommodated by the lost motion connection 17a and 31a.

For the purpose of imparting oscillatory to and fro motion to the driving arm 31 about the shaft 32 as a center, a cam 33 is securely affixed to and rotatable with the shaft 26. Cam 33 includes a cam groove 34 in which a cam follower 35 affixed to driving arm 31 is arranged to ride. Thus rotation of shaft 26 causes rotation of cam 33 and the action of cam follower 35 in groove 34 imparts to and fro oscillatory motion to driving arm 31. The velocity of oscillatory movement of arm 31 is of course controlled by the configuration of groove 34. The configuration of groove 34 is more accurately shown in enlarged view designated in FIG. 5.

Rotation of cam 33 causes the driving arm 31 to swing in a counterclockwise direction to the position represented in FIG. 2. As is apparent in FIG. 2 the rotator element 16 is in straddling relation relative to package P3. As driving arm 31 swings in a counterclockwise direction about shaft 32 the elements move from the position represented in FIG. 2 to the position shown in FIG. 3 at which position package P3 has been rotated 90° from the position represented in FIG. 2 and such rotation is in a counterclockwise direction as viewed from above. Continuation of the process results in rotation of the rotator element 16 to the position shown in FIG. 4 which completes rotation of P3 through an angle of 180° in a counterclockwise direction as viewed from above. Of course this rotary motion of package P3 and of rotator 16 is accompanied by translatory motion of conveyor 14 in the direction of arrow 15 and at the same velocity as the translatory movement of support means 17 of rotator element 16 and of driving means 21 along the rods 18 and 19.

After a predetermined degree of movement of packages P1, P2 and P3 along conveyor 14 and in the direction of the arrow 15, cam 33 will have rotated to such a position so as to impart counterclockwise rotation to driving arm 31 about shaft 32 and this motion drives the rotator 16, the support means 17 and the driving means 21 in the opposite direction from that represented by arrow 15 i.e. in an upstream direction to move the rotator to the position represented in FIG. 2 at which position the cycle repeats itself so as to rotate package P6 through 180°. This upstream movement of rotator element 16 causes the rotator 16 to straddle and bypass packages P4 and P5 since the spacing of prongs 16A and 16B is sufficient to allow clearance of packages P4 and P5.

For simplicity rotation of a package such as P3 through 180° in a direction such as counterclockwise as viewed from above is in the opposite direction from the direction of rotation of package P6 which is in a clockwise direction as viewed from above. This reversal of rotation is a characteristic of driving means 21 due to the rack and pinion construction of the rotatable driving means 21 which when the rack moves in one dirction in a translatory fashion imparts rotation in one direction such as clockwise and when the rack is moved in the opposite direction, opposite direction of rotation is effected.

INDUSTRIAL APPLICABILITY

This invention is applicable for use in conjunction with checkout counters employed in retail outlets and effectively precludes erroneous determination of price data due for example to inadvertent use of article identifying indicia on an individual item rather than proper use of a different indicia representative of a group of individual items.

I claim:

1. Apparatus for rotating one of a series of packages having spaced generally parallel opposite sides while being supported by and moved continuously on a moving conveyor along a predetermined path, said apparatus comprising slidably mounted support means having a driving pin and being disposed above said conveyor and movable in generally parallel synchronous relation therewith, a pivotally mounted driving arm having a slot for receiving said driving pin to impart movement to said support means via a lost motion connection, a rotator element mounted on and movable with said support means and having a generally U-shaped package enveloping means comprising a pair of spaced apart prongs which are in fixed positions relative to each other at such a distance as to allow clearance of the packages therebetween by straddling without gripping said one package, and pneumatically actuated rotatable driving means mounted on and movable with said support means and operable independently of the movement or position of said support means for imparting rotary movement to said rotator element, whereby upstream movement of said support means, of said rotator element, and of said driving means may be effected so as to cause said rotator element to straddle and bypass a preseleted one or more of said packages and to straddle said one package to be rotated and then to move downstream in synchronism therewith while rotating the said one package, the direction of rotation of said rotatable driving means being reversed for each successive rotating operation.

2. Apparatus according to claim 1 wherein oscillatory swinging movement is imparted to said driving arm by a rotatable cam and an associated cam follower mounted on said driving arm and wherein a groove is formed in said cam for receiving said cam follower and wherein said groove is configured to impart motion to said support means, to said rotator element and to said driving means which is in an upstream direction relative to movement of said conveyor followed by downstream movement thereof at a velocity substantially the same as the velocity of movement of said conveyor.

* * * * *